Patented Aug. 22, 1950

2,519,474

UNITED STATES PATENT OFFICE 2,519,474

COATED OPEN-MESH VINYLIDENE CHLORIDE FABRIC

William W. Jackson, Short Hills, and Ralph E. Porzer, Bloomfield, N. J., assignors to Celanese Corporation of America, a corporation of Delaware No Drawing. Application April 27, 1946, Serial No. 665,622

2 Claims. (Cl. 117—98)

This invention relates to screening or glazing materials and relates more particularly to the preparation of improved materials from mono-filaments of a polymerized vinyl compound and coated with a transparent film, which glazing materials have unusually high impact strength and superior resistance to physical deformation under extreme conditions of temperature as well as under strenuous flexing.

An object of this invention is to provide an improved screening or glazing material of high light transmission characteristics and capable of being bent repeatedly through a sharp angle without any permanent physical deformation or injury.

Another object of this invention is the provision of screening or glazing materials which, on prolonged exposure to relatively high temperatures, suffer a minimum of distortion due to shrinking.

A further object of this invention is to provide flexible screening or glazing materials of high impact strength.

Other objects of this invention will appear from the following detailed description.

Woven wire fabrics coated with a transparent film-forming material are widely employed in various structures as a glazing material. Although of a satisfactory degree of durability when subjected to normal weathering and service, the wire-base glazing materials have a measurable degree of opacity and, furthermore, do not stand up under repeated flexing or impact. In addition, when cut, the raw wire edges which are formed make the wire-base, coated glazing material difficult to handle without injury to the handler.

We have now found that glazing materials of superior shrinkage-resistance and strength may be obtained by coating and sealing a normally open-mesh fabric material woven of heavy denier filaments having a basic of a polymerized vinyl compound with a transparent, thermoplastic, film-forming cellulose derivative. Preferably, the transparent coating applied to said open-mesh fabric is present in an amount only sufficient to cover the filaments and to effectively seal the interstices between said filaments without embedding the woven fabric in the thermoplastic composition. In other words, the filaments forming the warp and weft of the woven fabric extend above and below the plane of the material closing the interstices thereof thus retaining the original woven character of the fabric.

The filaments employed in weaving the open-mesh fabric are formed, as stated, from a polymerized vinyl compound such as, for example, polymerized vinyl chloride, polymerized vinyl acetate, polymerized vinylidene chloride and copolymers thereof or of a copolymer of vinyl chloride and vinyl acetate. The filaments may be formed by extruding the desired polymerized vinyl compound in a thermoplastic condition through orifices of a suitable diameter and, after the polymerized vinyl compound has thus been shaped, conducting the shaped materials through a setting medium where the filaments set or solidify. For weaving into an open-mesh fabric, the filaments prepared in this way may have a diameter of from .005 to .020 inch or more, but preferably about .010 to .015 inch. In lieu of employing mono-filaments formed by extrusion of the filament-forming material through a single orifice, the filament-forming polymerized vinyl compound may be extruded through a plurality of orifices of smaller diameter to form a number of filaments of lower denier and the latter then associated together to form the desired mono-filament of heavy denier. The association of the several filaments into a mono-filament may be effected by drawing the several filaments through a die or series of dies in which they are forced together to form a single heavy denier filament or the filaments may be wetted with a solvent or softening agent and then twisted together so that the several filaments adhere to one another to form a single unitary filament structure. Several filaments may also be associated together to form a filament of greater diameter by merely twisting or plying the several filaments with or without the use of a solvent or softening agent to cause them to form a unitary structure.

Where colored filaments are desired, any suitable dye or pigment may be incorporated in the polymerized vinyl compound and the latter then subjected to a filament-forming operation. Thus, various substances may also be incorporated in the filaments to produce a nacreous effect. Examples of such substances are fish scale or synthetic mother-of-pearl compounds, such as, for example, the nacreous variety of mercurous chloride, lead iodide, lead acid phosphate or manganous ammonium phosphate. Highly decorative effects can also be secured by using various combinations of differently colored filaments in the warp or weft of the open-mesh webs. Since the pigments, dyes or other effect materials are incorporated in the structure of the filaments. the colors are permanent and highly resistant to weathering, abrasion, etc.

The open-mesh webs which are coated to form the screening or glazing materials of our invention may be formed by weaving or netting operations employing suitable textile devices to effect said operations. Thus, the heavy denier filaments may be woven together in a plain weave, a basket weave, a twill weave or in a weave which comprises plying or twisting a plurality of weft filaments about the several filaments constituting the warp. The heavy denier filaments may be woven, therefore, in any manner depending upon the structure or decorative effect desired.

To coat the open-mesh fabric thus formed and to close the interstices between the heavy denier filaments constituting the fabric structure, a coating solution or dope is formed containing a suitable proportion of cellulose acetate, or other film-forming organic derivative of cellulose, and the open mesh fabric then passed through the dope. The excess solution is drained from the coated fabric leaving a thin film of the coating material on the filaments and closing the interstices of the open-mesh fabric. The coated fabric may then be dried by passing it through a suitable drier wherein the excess volatile solvent employed in forming the coating composition is removed and recovered. The coating composition or dope which we employ preferably comprises 100 parts by weight of cellulose acetate, from 5 to 25 parts by weight of a plasticizer comprising an aromatic phosphate, from 5 to 25 parts by weight of an auxiliary plasticizer comprising an alkyl ester of phthalic acid dissolved in a sufficient amount of a volatile solvent or mixture of volatile solvents to produce the desired fluidity in the coating composition. As examples of suitable solvents which may be employed in forming the latter, there may be mentioned acetone, mixtures of acetone with ethyl alcohol, methyl ethyl ketone, or solvent mixtures comprising methyl alcohol, chloroform, benzol, amyl acetate, ethyl lactate and the like in various proportions to produce a coating composition or dope having the desired properties. By selecting the proper solvents in formulating the coating composition, it is possible to obtain a more satisfactory, controlled adhesion of the coating compositions to the filaments since the latter may be softened or otherwise acted upon by the solvents, thus enabling a more adherent coating to be applied. Most advantageously, we employ a coating composition containing 100 parts by weight of cellulose acetate, 15 parts by weight of triphenyl phosphate and 15 parts by weight of diethyl phthalate dissolved in a mixture of acetone and ethyl alcohol, the acetone varying from 80 to 100%. Preferably, a mixture of about 2% by weight of ethyl alcohol and 98% by weight of acetone are used.

The application of this coating composition to open-mesh fabrics woven of high denier mono-filaments of a polymerized vinyl compound, such as polymerized vinylidene chloride, has the entirely unexpected effect of substantially decreasing the heat shrinkage observed when such open-mesh fabric materials, in uncoated condition, are subjected to elevated temperatures for varying periods of time. The shrinkage of coated open-mesh fabrics woven of polymerized vinylidene chloride mono-filaments has been found to be 50% or less of that of uncoated open-mesh fabrics woven of said mono-filaments.

It is believed that the application of the coating composition has the effect of releasing the stresses and strains present in the extruded filaments, which stresses and strains are caused by the orientation of the molecules during the extrusion operation. The coating of the open-mesh fabric also greatly increases the impact strength or resistance to penetration.

In order further to illustrate our invention but without being limited thereto the following example is given:

*Example*

An open-mesh fabric is woven of polymerized vinylidene chloride mono-filaments 0.012 inch in diameter, the fabric having about 12 meshes to an inch. The open-mesh fabric is then coated with a cellulose acetate dope of the following composition:

| | Parts by weight |
|---|---|
| Cellulose acetate | 100 |
| Triphenyl phosphate | 15 |
| Diethyl phthalate | 15 |
| Acetone-ethyl alcohol (98:2) | 575 |

The openings between the strands are closed, and the strands themselves are covered, with a film of cellulose acetate by this coating operation. When subjected to a heat shrinkage test which comprises exposing the coated fabric to a temperature of 140° F. for 10 days, the coated fabric is found to shrink 2.3% in the warp and 2.1% in the weft. Uncoated open-mesh fabric subjected to these conditions shrinks 5% in the warp and 7.1% in the weft, a degree of shrinkage which is sufficient to tear the edges of the open-mesh fabric away from the supporting material or frame to which it is attached.

When subjected to impact tests employing a one-half pound cylindrical rod 1⅛ inches in diameter with a rounded end dropped from varying heights, the coated polymerized vinylidene chloride fabric exhibited no change whatever in structure when struck by the rod falling from a height of 9 feet. The coated fabric of polymerized vinylidene chloride filaments was only slightly cracked when the rod was dropped from a height of 10 feet. In comparison coated wire-base screening and even ¼" plate glass cracked when the weight was dropped thereon from a height of only one and one-half feet. This is somewhat surprising in view of the fact that wire has a tensile strength more than double that of the polymerized vinylidene chloride filaments.

While our invention has been more particularly described in connection with the use of cellulose acetate as the filament-forming material in the coating composition, other organic derivatives of cellulose such as cellulose propionate, cellulose butyrate, cellulose-acetate propionate, cellulose-acetate-butyrate or cellulose ethers such as ethyl cellulose, may be employed in lieu thereof. In addition to the plasticizers mentioned as being suitable in formulating the coating composition, we may also employ dibutyl tartrate, triacetin, methyl phthalyl methyl glycollate, etc.

The novel coated polymerized vinylidene chloride screening or glazing material of our invention is not only light in weight, non-flammable and of a pleasing appearance, but said materials do not conduct heat or electricity, which is highly desirable in many applications. The extreme flexibility attained makes it particularly suitable for use not only in window shades, awnings, or lamp shades, but enables it to be employed in the fabrication of tubular containers provided with either longitudinal or spiral seams that can be readily cemented or sewn together. The coated screening or glazing material may also be employed as an interlayer or laminating medium between plastic sheets to produce reinforced products.

Our screening or glazing material is capable of withstanding severe weathering tests without crazing, cracking, warping or developing an objectionable deterioration in the total light transmission which is initially about 20% more than that of a coated wire product. Thus, the excellent flexibility of the product is still preserved after 40 days of aging at a temperature of 140° F. with no cracks developing when the screening or glazing material is sharply folded. Exposure at 100% relative humidity and a temperature of 140° F. for 14 days produces no exudation or tackiness of the material.

The ultra-violet transmission characteristic of the screening material of our invention is substantially greater than screening materials having an opaque wire base, permitting a far greater proportion of the beneficial health rays in the ultra-violet portion of the spectrum to pass than in the case of wire base materials. For example, at a wave length of 296 millimicrons, the percent transmission of wire coated with cellulose acetate is about 10% as compared with 30% for coated polymerized vinylidene chloride material, thus indicating an increase of about 200%.

It is to be understood that the foregoing detailed description is given merely by way of illustration and that many variations may be made therein without departing from the spirit of our invention.

Having described our invention, what we desire to secure by Letters Patent is:

1. A screening or glazing material of high impact strength and resistant to deformation on exposure to elevated temperature, comprising a woven open-mesh fabric consisting of filaments of polymerized vinylidene chloride coated with a transparent film of an organic acid ester of cellulose, said film extending across and closing the interstices between the filaments of the fabric.

2. A screening or glazing material of high impact strength and resistant to deformation on exposure to elevated temperature, comprising a woven open-mesh fabric consisting of filaments of polymerized vinylidene chloride coated with a transparent film of cellulose acetate, said film extending across and closing the interstices between the filaments of the fabric.

WILLIAM W. JACKSON.
RALPH E. PORZER.

REFERENCES CITED

The following references are of record in the file of this patent:

UNITED STATES PATENTS

| Number | Name | Date |
|---|---|---|
| 2,086,729 | Moss | July 13, 1937 |